(12) United States Patent
McChesney

(10) Patent No.: US 6,764,192 B2
(45) Date of Patent: Jul. 20, 2004

(54) COMBINATION MAGNIFIER AND ILLUMINATOR

(76) Inventor: Paula McChesney, 724 Tulane Ct., San Mateo, CA (US) 94402

( * ) Notice: Subject to any disclaimer, the term of this patent is extended or adjusted under 35 U.S.C. 154(b) by 0 days.

(21) Appl. No.: 09/967,802

(22) Filed: Oct. 1, 2001

(65) Prior Publication Data

US 2003/0063459 A1 Apr. 3, 2003

(51) Int. Cl.[7] ............................. A47B 19/00; G02B 27/02
(52) U.S. Cl. ............................. 362/98; 362/31; 362/295; 362/109; 359/802; 359/803
(58) Field of Search ................................. 362/800, 311, 362/394, 98, 99, 31, 295, 253, 109; 359/799, 800, 802, 803

(56) References Cited

U.S. PATENT DOCUMENTS 5,113,327 A * 5/1992 Levy ............................. 362/109
5,442,528 A * 8/1995 Vandenbelt .................. 362/198
5,471,347 A * 11/1995 Galiani ........................ 359/807
5,642,234 A * 6/1997 Altman et al. ............... 359/802
6,384,988 B1 * 5/2002 Muller et al. ................ 359/798
6,483,651 B1 * 11/2002 Maurer ........................ 359/819

* cited by examiner

Primary Examiner—Alan Cariaso
Assistant Examiner—Ali Alavi
(74) Attorney, Agent, or Firm—Michael A. Shippey

(57) ABSTRACT

A combination magnifier and illuminator comprised of a rigid rectangular housing that encloses a swing out lens retaining frame. The lens is a fresnel type which is very thin in nature that allows the entire thickness of the present invention to be less than one quarter of an inch thick. An ultra light white LED automatically turns on when the user swings out the magnifying lens allowing the user to see items such as a map or menu in low light conditions. The LED is powered by a button type battery that is housed in the circular space located at the pivot point of the swing out magnifier frame.

2 Claims, 5 Drawing Sheets

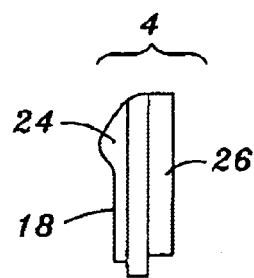
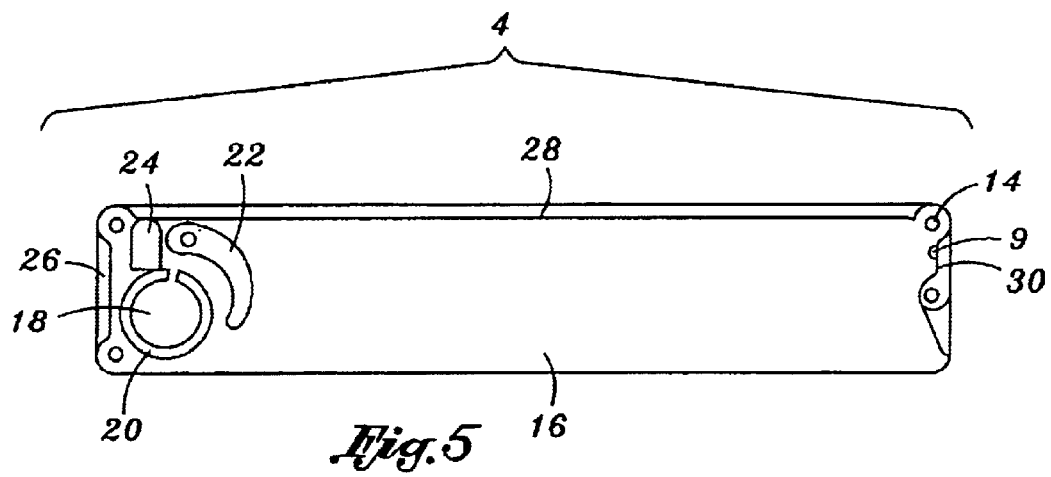
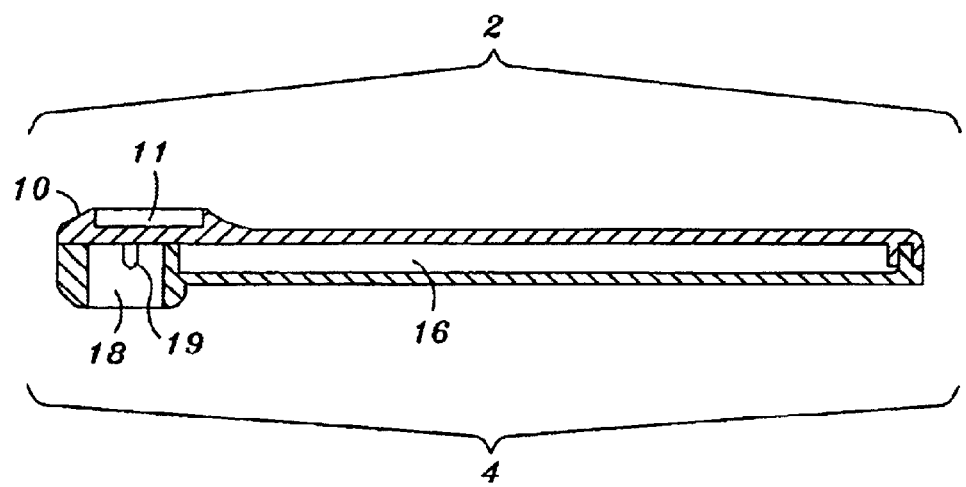

COMBINATION MAGNIFIER AND ILLUMINATOR

BACKGROUND OF THE INVENTION

This invention relates generally to the field of reading aids, and more particularly to a combination magnifier and illuminator.

Magnifying devices have been in existence for hundreds of years. Illuminating devices such as electric lightbulbs have been in existence for over one hundred years. More recently small lamps called light diodes or LED's have been developed which emit light while using very little electrical power. Most recently, a high powered white LED has been developed which can allow a person to see and read under very low light conditions. Additionally, a new type of magnifying lens called a fresnel lens has been developed and in use for the last thirty years. A fresnel lens is molded of clear plastic and, because of its concentricly ridged design, is very flat compared to typical glass or plastic lenses.

Products have been developed that have combined a typical magnifier lens with a lighting element so that a person can more clearly see a map or menu or the like under low light conditions.

However, the prior designs use standard magnifier elements and therefore tend to be somewhat thick in cross section. Although some of these units can fit in ones pocket, they are not as thin and inconspicuous when stored as they could be.

SUMMARY OF THE INVENTION

The primary object of the invention is to provide a combination magnifier and illuminator that fits easily into a persons pocket.

Another object of the invention is to provide a combination magnifier and illuminator that is very slim in overall thickness.

Another object of the invention is to provide a combination magnifier and illuminator where said illuminator automatically turns on when the magnifier portion is pulled out.

A further object of the invention is to provide a combination magnifier and illuminator where the housing includes a recessed portion that can receive a custom decorative element.

Other objects and advantages of the present invention will become apparent from the following descriptions, taken in connection with the accompanying drawings, wherein, by way of illustration and example, an embodiment of the present invention is disclosed.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

FIG. 4 is a side view of the present invention

FIG. 5 is a plan view of the lower housing of the present invention

FIG. 6 is a side section view of the present invention

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
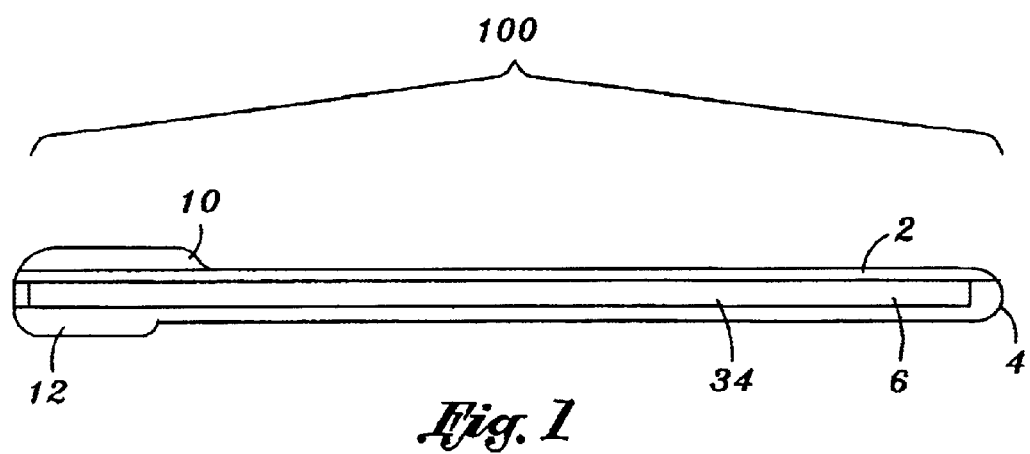
FIG. 1 is a side view of the combination magnifier and illuminator of the present invention.
Figure 2:
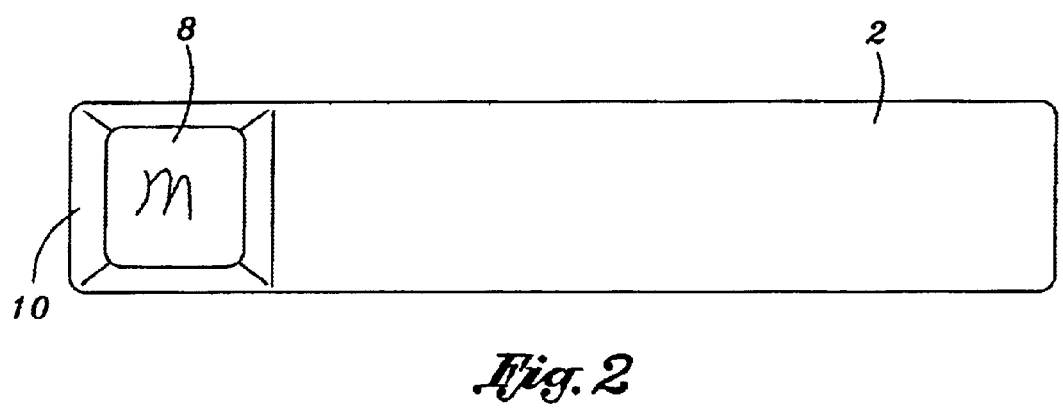
FIG. 2 is a front view of the present invention
Figure 3:
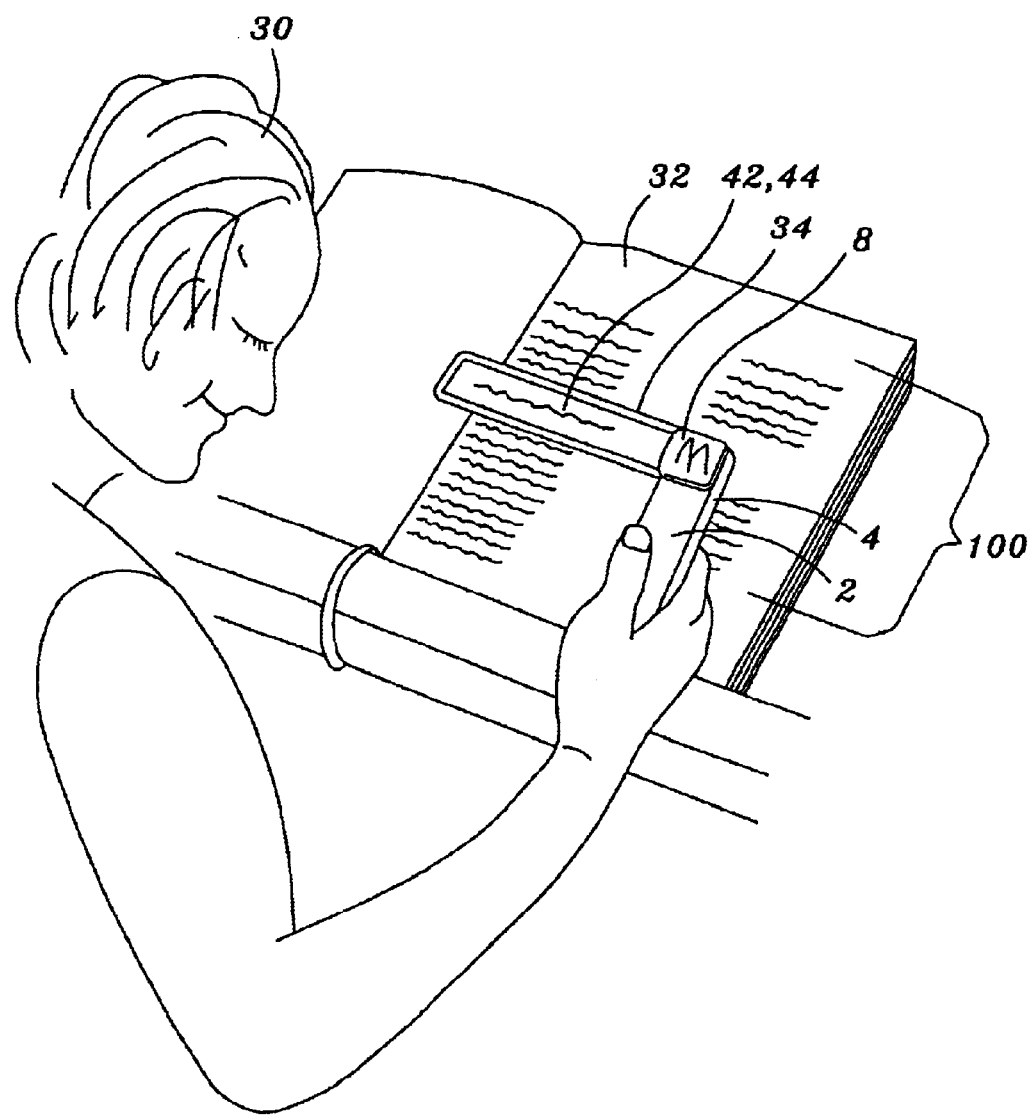
FIG. 3 is a perspective view of a person using the present invention
Figure 7:
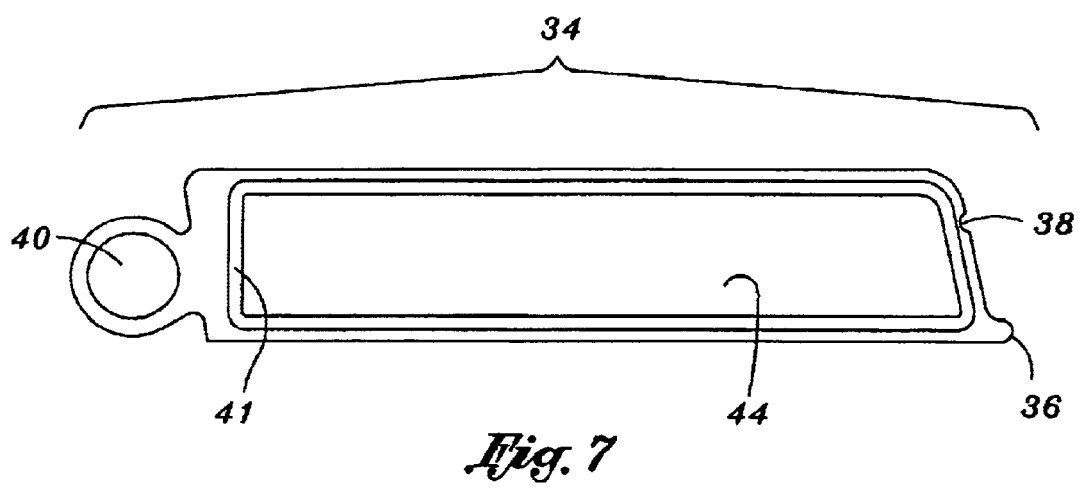
FIG. 7 is a plan view of the magnifier frame portion of the present invention
Figure 8:
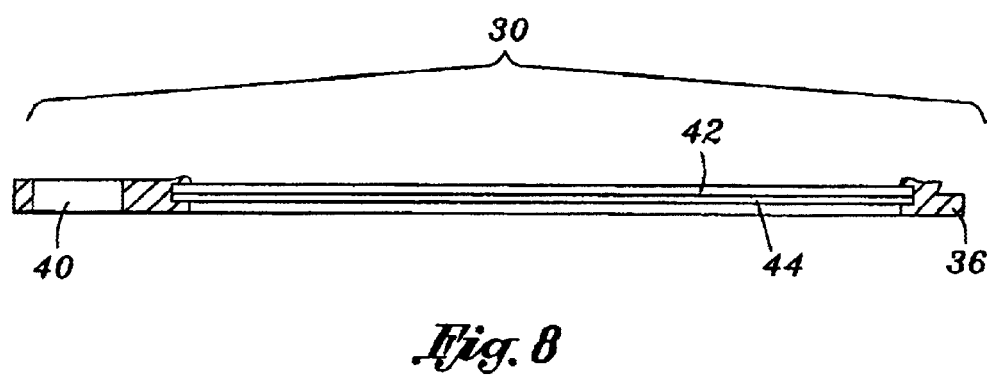
FIG. 8 is a side view of the magnifier frame portion of the present invention
Figure 9:
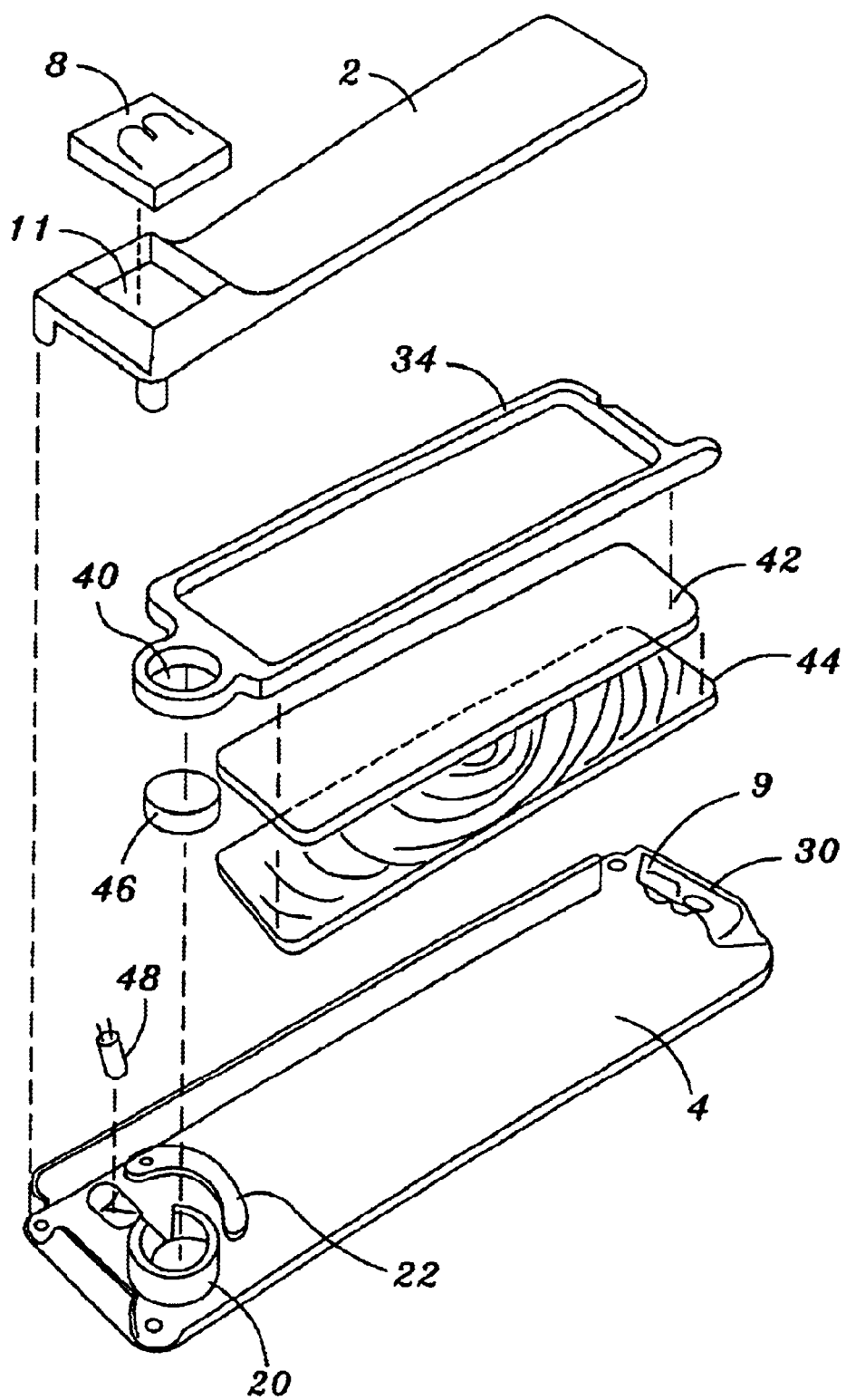
FIG. 9 is an exploded view of the present invention

Referring now to FIG. 1 we see a side view of the combination magnifier and illuminator 100 of the present invention. The main housing is comprised of a top plate 2 and a bottom plate 4. Opening 6 houses a frame 34 that retains a magnifying lens as will be shown in future views. FIG. 2 shows a plan view showing the top plate 2 of the present invention. The top plate 2 includes a small raised frame portion 10 that is integral to the top plate 2 allowing the manufacturer to insert a decorative element 8 that may be generic or may be customized to the user as the letter M shows. FIG. 3 shows a perspective view where a person 30 is using the present invention 100. The magnifier lens assembly 34, 42, 44 is swung out allowing the user to enlarge lettering in a book 32. The user holds the invention 100 by housing 2, 4. FIG. 4 shows a side view of the bottom plate 4. LED retaining portion 24 and battery holding portion 18 can be seen as being slightly thicker than the rest of the base plate 4. FIG. 5 is a plan view of base plate 4. In this view one can clearly see that the two short sides 26, 30 and one long side 28 have raised side panels, whereas side 16 has no side wall to allow the magnifier frame 34 to swing out. Raised circular wall 20 can retain a button type battery in space 18. Depressed area 24 houses an ultra bright white LED 48. Leaf spring 22 acts as a switch so that when the magnifier frame 34 is swung out, the leaf spring is pushed down and completes a circuit the battery 46 thereby illuminating LED 48. Swinging the magnifier frame 34 back into housing 2,4 automatically turns off LED 48. Apertures 14 located at corners of the base plate 4 accommodate screws that fasten the base plate 4 to top plate 2. FIG. 6 is a section view That shows clearly battery housing 18. Slot 19 in battery housing 18 allows wires to exit the battery housing and to connect to the LED 48 and leaf spring switch 22. FIG. 7 is a plan view of magnifier frame 34. Circular cut out portion 40 is slightly larger than circular battery housing 20. Battery housing 20 acts as a pivot point allowing magnifier frame 34 to swing out from housing 2, 4. Ledge surround 41 retains fresnel magnifying lens 44 and clear glass cover plate 42. The extent ion tip 36 allows the user to grab the tip 36 with his or her finger tip to swing open the magnifier frame 34. Detent 38 interacts with protrusion 9 located on side wall 30 of bottom plate 4. Thin glass plate 42 covers thin fresnel magnifying lens 44 and are both retained by frame 34. The nature of a fresnel lens is that it is a series of concentric ridges molded out of clear plastic, allowing the lens to be much thinner than a traditional optical magnifying lens. As a result of the thin lens 44 and the small nature of the LED 48 light source is that the overall thickness of the present invention 100 is less than one quarter of an inch. This thin cross section allows a user to place the present invention in his or her pocket or purse without taking up an undue amount of space.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Combination magnifier and illuminator comprising: a rectangular shaped rigid housing made of plastic or metal; said housing comprised of a top plate, a bottom plate having integral side walls on two opposing short sides and one long side so that one long side remains open; said housing capable of retaining a frame that retains a fresnel type magnifying lens; said magnifier frame being partially removable in a rotational fashion about a circular battery housing member so that said frame swings out approximately ninety degrees from said long side opening in said housing; said battery being of the round, button type; an ultra bright white LED type illuminating element; and a spring metal member that acts as a switch by connecting electricity from said LED to said battery source.

2. A combination magnifier and illuminator as described in claim 1, further comprising a small raised frame member that is integral to the top surface of said top plate for inserting a decorative element.

* * * * *